United States Patent
Yavuz (10) Patent No.: US 11,588,645 B1
(45) Date of Patent: Feb. 21, 2023

(54) SYSTEMS AND METHODS FOR COMPROMISE RESILIENT AND COMPACT AUTHENTICATION FOR DIGITAL FORENSICS

(71) Applicant: University of South Florida, Tampa, FL (US)

(72) Inventor: Attila A. Yavuz, Tampa, FL (US)

(73) Assignee: University of South Florida, Tampa, FL (US)

( * ) Notice: Subject to any disclaimer, the term of this patent is extended or adjusted under 35 U.S.C. 154(b) by 253 days.

(21) Appl. No.: 17/009,884

(22) Filed: Sep. 2, 2020

Related U.S. Application Data (60) Provisional application No. 62/896,705, filed on Sep. 6, 2019.

(51) Int. Cl.
*H04L 29/06* (2006.01)
*H04L 9/32* (2006.01)
*H04L 9/14* (2006.01)
*H04L 9/30* (2006.01)

(52) U.S. Cl.
CPC .............. *H04L 9/3247* (2013.01); *H04L 9/14* (2013.01); *H04L 9/3073* (2013.01)

(58) Field of Classification Search
CPC ........ H04L 9/3247; H04L 9/14; H04L 9/3073
See application file for complete search history.

(56) References Cited

U.S. PATENT DOCUMENTS

| | | | |
|---|---|---|---|
| 8,082,446 B1 | 12/2011 | Carroll | |
| 8,189,788 B2 * | 5/2012 | Narendra | H04L 9/0866 380/270 |
| 9,692,595 B2 | 6/2017 | Lowans et al. | |
| 10,536,537 B1 * | 1/2020 | Le | G06Q 20/386 |
| 2009/0187766 A1 * | 7/2009 | Vuillaume | G06F 21/33 713/176 |
| 2013/0326224 A1 * | 12/2013 | Yavuz | H04L 9/3247 713/176 |

(Continued)

FOREIGN PATENT DOCUMENTS

| | | | | |
|---|---|---|---|---|
| CN | 107968708 A | * | 4/2018 | ......... G06F 16/1834 |
| CN | 110097362 A | * | 8/2019 | |

(Continued)

OTHER PUBLICATIONS

M. Abdalla and L. Reyzin. A new forward-secure digital signature scheme. In Advances in Crpytology (ASIACRYPT '00), pp. 116-129. Springer-Verlag, 2000.

(Continued)

*Primary Examiner* — Sher A Khan (74) *Attorney, Agent, or Firm* — Meunier Carlin & Curfman LLC (57) ABSTRACT

A new compromise-resilient and compact cryptographic tool is provided that ensures a breach-resilient authentication and integrity of system measurements in computer systems. The described methods are forward-secure digital signatures with signature and partial public key aggregation capabilities. The methods reduce the total space overhead of signature and public key storage. The methods offer a high space efficiency for systems who has relatively low state transitions, wherein the same message is continuously signed and then followed by different messages.

16 Claims, 3 Drawing Sheets

(56) References Cited

U.S. PATENT DOCUMENTS

| | | | | |
|---|---|---|---|---|
| 2018/0102903 A1* | 4/2018 | Kipnis | ............... | H04L 9/3236 |
| 2018/0329783 A1* | 11/2018 | Karame | ............. | G06F 11/0709 |
| 2022/0247570 A1* | 8/2022 | Watanabe | ............... | H04L 9/32 |

FOREIGN PATENT DOCUMENTS

| | | | | | |
|---|---|---|---|---|---|
| JP | 2005012490 A | * | 1/2005 | | |
| JP | 2011055424 A | * | 3/2011 | | |
| KR | 101703880 B1 | * | 2/2017 | ......... | G06F 16/1834 |
| KR | 101703880 B1 | | 2/2017 | | |

OTHER PUBLICATIONS

R. Accorsi. Log data as digital evidence: What secure logging protocols have to offer? In International Computer Software and Applications Conference (COMPSAC '09), pp. 398-403, 2009.

M. Bellare and P. Rogaway. Introduction to modern cryptography. In UCSD CSE Course, p. 207. 1st edition, 2005. http://www.cs.ucsd.edu/~mihir/cse207/classnotes.html.

Dan Boneh, Manu Drijvers, and Gregory Neven. Compact multi-signatures for smaller blockchains. In Advances in Cryptology—ASIACRYPT 2018, pp. 435-464, Cham, 2018. Springer International Publishing.

Dan Boneh, Ben Lynn, and Hovav Shacham. Short signatures from the weil pairing. In Colin Boyd, editor, Advances in Cryptology—ASIACRYPT 2001, pp. 514-532. Springer Berlin Heidelberg, 2001.

C. N. Chong and Z. Peng. Secure audit logging with tamper-resistant hardware. In Proceedings of the 18th IFIP International Information Security Conference, pp. 73-84. Kluwer Academic Publishers, 2003.

E. Cronin, S. Jamin, T. Malkin, and P. McDaniel. On the performance, feasibility, and use of forward-secure signatures. In Proceedings of the 10th ACM Conference on Computer and Communications Security (CCS '03), pp. 131-144. ACM, 2003.

S. Crosby and D. S. Wallach. Efficient data structures for tamper evident logging. In Proceedings of the 18th conference on USENIX Security Symposium, Aug. 2009.

D. Davis, F. Monrose, and M. Reiter. Time-scoped searching of encrypted audit logs. In Proc. of the 6th International Conference on Information and Communications Security (ICICS '04), pp. 532-545, 2004.

D. Hankerson, A. Menezes, and S. Vanstone. Guide to Elliptic Curve Cryptography. Springer, 2004.

J. E. Holt. Logcrypt: Forward security and public veri_cation for secure audit logs. In Proc. of the 4th Australasian workshops on Grid computing and e-research (ACSW '06), pp. 203-211, 2006.

M. Jakobsson. Fractal hash sequence representation and traversal. In Proceedings of the 2002 IEEE International Symposium on Information Theory (ISIT '02), pp. 437-444. IEEE, 2002.

D. Ma. Practical forward secure sequential aggregate signatures. In Proceedings of the 3rd ACM symposium on Information, Computer and Communications Security (ASIACCS '08), pp. 341-352, NY, USA, 2008. ACM.

D. Ma and G. Tsudik. Forward-secure sequential aggregate authentication. In Proceedings of the 28th IEEE Symposium on Security and Privacy (S&P '07), pp. 86-91, May 2007.

D. Ma and G. Tsudik. A new approach to secure logging. In Proc. of the 22nd Annual IFIP WG 11.3 Working Conference on Data and Applications Security (DBSEC '08), pp. 48-63, 2008.

D. Ma and G. Tsudik. A new approach to secure logging. ACM Transaction on Storage (TOS), 5(1):1-21, 2009.

T. Malkin, D. Micciancio, and S. K. Miner. Efficient generic forward-secure signatures with an unbounded number of time periods. In Proc. of the 21th International Conference on the Theory and Applications of Cryptographic Techniques (EUROCRYPT '02), pp. 400-417. Springer-Verlag, 2002.

R. Merkle. Protocols for public key cryptosystems. In Proceedings of the IEEE Symposium on Research in Security and Privacy, Apr. 1980.

B. Schneier and J. Kelsey. Cryptographic support for secure logs on untrusted machines. In Proc. of the 7th conference on USENIX Security Symposium. USENIX Association, 1998.

B. Schneier and J. Kelsey. Secure audit logs to support computer forensics. ACM Transaction on Information System Security, 2(2):159-176, 1999.

C. Schnorr. Efficient signature generation by smart cards. Journal of Cryptology, 4(3):161-174, 1991.

A. A. Yavuz and P. Ning. BAF: An efficient publicly variable secure audit logging scheme for distributed systems. In Proceedings of 25th Annual Computer Security Applications Conference (ACSAC '09), pp. 219-228, 2009.

A. A. Yavuz, Peng Ning, and Michael K. Reiter. BAF and FI-BAF: Efficient and publicly variable cryptographic schemes for secure logging in resource constrained systems. ACM Transaction on Information System Security, 15(2), 2012.

Attila Altay Yavuz. ETA: Efficient and tiny and authentication for heterogeneous wireless systems. In Proceedings of the sixth ACM conference on Security and privacy in wireless and mobile networks, WiSec ' 13, pp. 67-72, New York, NY, USA, 2013. ACM.

* cited by examiner

SYSTEMS AND METHODS FOR COMPROMISE RESILIENT AND COMPACT AUTHENTICATION FOR DIGITAL FORENSICS

CROSS-REFERENCE TO RELATED APPLICATIONS

This application claimed priority to U.S. Provisional Patent Application Ser. No. 62/896,705 filed on Sep. 6, 2019 and titled "SYSTEMS AND METHODS FOR COMPROMISE RESILIENT AND COMPACT AUTHENTICATION FOR DIGITAL FORENSICS." The contents of which are hereby incorporated by reference in their entirety.

STATEMENT REGARDING FEDERALLY SPONSORED RESEARCH OR DEVELOPMENT

This invention was made with government support under grant #1652389 awarded by the National Science Foundation. The Government has certain rights in the invention.

BACKGROUND

An important functionality of a cryptographic digital forensic tool is to provide tamper-proof evidence and protection for the digital artifacts (e.g., audit logs) generated by a computer system. Logs provide critical information on the past states of a machine such as system events, security incidents and failures. They have a central role in law investigations and legal dispute resolution. Due to their forensic value, logs are among the primary targets of the attackers. For instance, an attacker breaching into a computer can erase its own traces and/or implicate innocent users by tampering audit logs.

Hence, it is an indispensable tool to offer authentication and integrity for computer applications including audit logs. Any security critical computer system ideally needs such digital forensic tools to ensure public verifiability and non-repudiation that are important for legal and financial cases. Some examples include security cameras and sensors, cloud systems (e.g., file versioning, storage), digital archives and financial systems. In all these systems, security-critical data is collected from users and maintained with auditing requirements. The trustworthiness of these applications depends on the presence of publicly verifiable evidence that can prove whether the data collected and maintained are authentic and intact. Ideally, these security guarantees must be maintained at some degree even in the presence of active attackers who may breach into the computer system (e.g., malware, physical intervention).

Several cryptographic methods have been developed to provide basic cyber security services such as authentication, integrity, and confidentiality. In addition to these basic services, emerging digital forensic tools also need advanced features such as breach-resiliency (e.g., compromise-resiliency), compactness and public verifiability. For example, given increased attack surface, an active adversary may compromise sensors and gadgets deployed in the smart building, and recover not only sensitive data but also the cryptographic keying material that was used to protect the information. Similarly, via insiders and/or malware infiltration, the cloud servers are also frequently breached. Hence, an ideal cryptographic protection mechanism must achieve high efficiency, breach-resiliency, scalability, and non-repudiation properties simultaneously. In particular, due to a high volume of data collected from a large number of users, achieving these goals with a high level of space efficiency is of paramount importance. Unfortunately, existing symmetric and asymmetric cryptographic techniques might not achieve all these goals at the same time.

In one line of cryptographic digital forensics, several symmetric cryptography based secure audit logging techniques have been proposed. These techniques mainly rely on Message Authentication Codes, hash chains, and Merkle-hash trees. A common system architecture in these schemes is that, the signers (aka, loggers) share a symmetric key with a trusted server, and uploads cryptographically secure audit logs to this trusted server. This server acts as an auditor and verifies the authenticity of log entries by using the secret keys shared with the signers.

Many of these techniques are near-optimal efficient in terms computation and communication overhead due to their reliance on highly efficiency symmetric primitives. Some of these techniques also achieve signer-side (i.e., logger side) compromise resiliency via an implementation of forward-secure symmetric MACs with hash-chains. Some of these techniques can also offer "all-or-nothing" features, wherein an adversary cannot selectively delete log entries from a log trail without being detected.

However, the symmetric cryptography based secure logging techniques have the following drawbacks: (i) They cannot achieve non-repudiation and public verifiability, since the verifier shares the same key with signer(s). That is, the verifier server can easily generate an authentication tag on behalf of any signer of its choice, since it has all the shared keys. Remark that, the lack of non-repudiation is a significant drawback for many logging applications (e.g., financial and law audits) that need a dispute resolution mechanism. Non-repudiation also alleviates the liability on verifiers, since they cannot be accused of creating fake authentication tags. (ii) The direct application of these techniques to secure logging might create vulnerabilities against active adversaries. Specifically, if the verifier is compromised by an active adversary (e.g., a malware or insider collusion), the security of all signers, with whom the verifier shares symmetric keys, are also compromised. (iii) Some alternative symmetric techniques rely on distributed verification and encryption. Despite their merits, these methods assume the continuous availability of distinct and non-colluding multiple parties. This may not be suitable for real-life applications that require public verification by any entity (but not a few selected ones).

In another line of cryptographic digital forensics, public key cryptography based secure audit logging techniques have been proposed. These schemes are mainly based on digital signatures, which can guarantee public verifiability and non-repudiation properties. Moreover, since they rely on public keys for verification, they by default achieve verifier compromise resiliency and availability (anybody can verify the logs without relying on a trusted party).

Many of these schemes either adapt or create new forward-secure and/or aggregate signature schemes to offer signer-side compromise resiliency and compactness. The signature aggregation offers an added benefit of append-only feature, wherein one can only add to a trail of audit logs but cannot selectively delete from it without being detected. Below, are described limitations of some essential schemes with these properties.

Forward-secure signatures achieve compromise resiliency via a key evolving strategy. That is, after a signature is computed, the signer updates its private key (e.g., via a one-way function like a cryptographic hash function) and delete the previous one. At this point, even if an adversary compromises the system and obtains the current private key, it cannot compute the previous private key since it is deleted and the current private is generated via a one-way function from the previous one. Several forward-secure signatures with various performance properties have been proposed. One of the most notable forward-secure signatures is MMM proposed by Malkin, Micciancio and Miner (i.e., MMM), which can transform any signature scheme into a forward-secure signature scheme with a practically unbounded number of time periods.

Despite their merits, forward-secure signatures substantially increase the public key, signature and/or private key sizes due to key update operations. They may also incur high computational overhead. Forward-secure and aggregate signatures have been proposed to offer signature aggregation with forward-security to reduce the storage and transmission overhead. Some of the most efficient and secure forward-secure and aggregate signatures are FssAgg and BAF schemes. Despite their merits, these signature schemes can only operate up to a pre-defined (small) number of time periods. This is a limiting factor for long-term and high sampling rate security monitoring applications. Moreover, these techniques do not offer public key aggregation feature. A multi-signature scheme is a special type of multi-user aggregate signature, in which the signature computed on the same message by multiple users can be aggregated. One recent multi-signature can aggregate both signature and public keys for a pre-defined (small) number of users. However, this multi-signature does not offer forward-security, and it is for a multi-user model. On the other hand, all the previously mentioned forward-secure and aggregate signatures are in a single-signer model with the store-and-forward setting.

The frequency of key updates in forward-secure signatures raise a security-performance trade-off. A frequent key update offers another granularity of forward-security in the event of a security breach. For instance, assume that the data collected by a security camera is forward-secure signed every hour. In this case, if the keys are compromised even at the last minute of this period, the adversary can forge all the data collected in this period (i.e., an hour). However, if key update frequency is set to a minute, the adversary cannot forge signatures collected in the duration of previous 59 minutes. Hence, security critical applications need higher rates of key updates. The frequency of key update and signature generation on accumulated data is referred to herein as the sampling rate. However, despite its security merit, a higher sampling rate also implies higher computational and storage/transmission overhead. Each key update and signing produce a new signature along with expanded public and/or private key sizes depending on the key update schedule. In a system with a long-life span, the overhead of frequent key updates (e.g., per second sampling rate for 10 years) can be significant.

Therefore, there is a critical need for forward-secure and aggregate signatures that can offer high space efficiency by reducing the total overhead of signature, private and public key sizes.

SUMMARY

Novel forward-secure and aggregate signature schemes that offer signature and partial (conditional) public key aggregation with a high-efficiency for a practically unbounded number of time periods are provided. These schemes are referred to herein as COmpact and REsilient (CORE) cryptographic forensic tools. Specifically, two CORE signatures are created: $CORE_{Base,t}^{BLS}$ and $CORE_{Base,t}^{ETA}$ which are based on Boneh-Lynn-Shacham ("BLS") BLS and Efficient and Tiny Authentication ("ETA") signatures, respectively. Both schemes offer high space efficiency, but $CORE_{Base,t}^{BLS}$ prioritizes signature compactness while $CORE_{Base,t}^{ETA}$ focuses on verifier computational efficiency. Other types of digital signatures may be used.

In the CORE schemes, a single-signer forward secure and aggregate signature scheme is created with a t pre-defined time period (also referred to as sampling time/number or epoch). This base scheme can not only aggregate signatures $(\sigma_j, \ldots, \sigma_{j'})$ computed with distinct private keys $(sk_j, \ldots, sk_{j'})$ but also their public keys $(pk_j, \ldots, pk_{j'})$ as long as the message remains the same during contagious sampling periods ($1 \leq j \leq j' \leq t$). This property reduces the total size of the signature and public keys. The t-time bounded scheme is then extended into practically unbounded forward-secure signature scheme by using generic techniques such as iterative product and/or sum compositions presented in MMM. Since the performance of MMM composition is dictated by its base 2 scheme, the base t-time bounded schemes offer high space efficiency. The efficiency argument is described below:

Space and Computational Efficiency: Some of the most efficient single-signer aggregate and forward-secure signatures offer t public key storage overhead for t-time period. In this construction, at the best case, if all data items sampled in t-time period are identical, then all of the distinct public keys can be aggregated that results in only one public key storage (i.e., t times more space efficient than their counterparts). At the worst-case, each sampled data item is different from the previous item, and therefore the public key overhead is t as in its counterparts. Hence, in average case, the constructions described herein offer (1+t)/2, which is twice as efficient than their counterparts. The exact efficiency of the constructions may depend on the number and length of contagious sampling periods, in which the sampled data item remains the same. This space gain factor is described as $1 \leq \delta \leq t$.

The number of available time periods that the described schemes can support is extended via MMM construction to obtain a practically unbounded number of time periods. This can be done by using iterative product composition in MMM, by iterating the t-time bounded construction n times, which results in $t^n$ time period in total. For example, given $t=2^6$ and $n=5$, a signature scheme is obtained that permits up to $2^{30}$ sampling (i.e., forward-secure and aggregation signing) capacity. This is potentially sufficient for many practical purposes. For example, with a sampling rate of per second, this extended construction can continuously compute signatures over 30 years uninterrupted. The signature/key size of product composition for one iteration grows additively. Hence, n iteration of the base schemes offer $$\sum_{i=1}^{n} \delta_i$$

space efficiency gain over the instantiation of aforementioned alternative forward-secure and aggregate signatures with MMM iterative product composition. For example, assuming $\delta=2$ for all iterations and $n=5$, the constructions are approximately a magnitude times more space efficient than the use of existing alternatives with MMM iterative product composition. However, in some real-life applications, this gain can be much higher. That is, the performance gain will be higher for use-cases that have infrequent state changes for the sampled data. Below, such real-life applications that are potentially suitable use-cases for CORE are discussed.

In some security monitoring applications, the system state often remains unchanged for relatively long time intervals. For instance, consider a personal bank account status. The number of transactions (changes) on a basic personal financial account per day is limited, and the status of the account may remain identical for most of the day. Therefore, there will be multiple and long contagious sampling periods in which the sampled data items remain the same. This permits significant public key aggregation benefits for both base t-time bounded CORE and even more so for its full extensions via MMM as discussed above.

Similarly, consider measurements taken by a security camera and/or sensor positioned in a remote street or a facility/room. Depending on applications, the camera/sensor may capture only a few movements in a given hour, while readings remain the same between these rare state changes. Similar examples can be found on basic user cloud accounts and OS kernel systems, wherein updates might not be frequent. Finally, digital archive systems might exhibit similar characteristics. The proposed CORE cryptographic tool can offer significant space gains for such applications.

The schemes described herein preserve some of the most important advantages of previous single-signer public key constructions such as forward-security, aggregation, append-only feature, non-repudiation, and publicly verifiability. Moreover, unlike FssAgg-BLS and BAF/FI-BAF, the schemes offer partial public key aggregation and small-constant size main public key. The schemes also achieve highly efficient extensions via MMM iterative constructions that were not investigated by previous single-signer forward-secure and aggregate signatures. Unlike existing non-interactive multi-signatures designed for multi-user setting, the schemes use a single-signer model with forward-security and are more computationally efficient than the direct transformation of multi-signatures into the single-signer setting with a forward-security. The basic attacks applied to multi-user settings such as rogue-key attacks are also prevented easily since t-time public key in the single-user setting is pre-defined during the key generation, and extension to larger time periods is protected by MMM iterative product/sum (which is proven to be a secure forward-secure).

In an embodiment, a method is provided. The method includes: receiving a plurality of messages, wherein each message is associated with a time period from a set of time periods; receiving a plurality of public key and private key pairs, wherein each pair is associated with a time period from the set of time periods; and for each message of the plurality of messages: using the private key for the message to generate an aggregate signature for the message based on the message and an aggregate signature of a previous message of the plurality of messages; and generating an aggregate public key for the message using the public key associated with the message and an aggregate public key associated with the previous message.

Embodiments may include some or all of the following features. The method may further include providing the aggregate public key and aggregate signature of a last message of the plurality of messages. The method may further include authenticating at least one message of the plurality of messages using the provided aggregate public key and aggregate signature. At least some of the messages of the plurality of messages may be the same. The aggregate signatures may be generated using a BLS signature scheme. The aggregate signatures may be generated using an ETA signature scheme. The aggregate public keys and aggregate signatures may be combined for a plurality of different sets of time periods using an MMM generic digital signature scheme.

In an embodiment, a system is provided. The system includes at least one processor and a tangible computer readable medium. The computer readable medium may store instructions that when executed by the at least one processor cause the at least one processor to: receive a plurality of images, wherein each image is associated with a time period from a set of time periods; receive a plurality of public key and private key pairs, wherein each pair is associated with a time period from the set of time periods; and for each image of the plurality of images: use the private key for the message to generate an aggregate signature for the image based on the image and an aggregate signature of a previous image of the plurality of images; and generate an aggregate public key for the image using the public key associated with the image and an aggregate public key associated with the previous image.

Embodiments may include some or all of the following features. The instructions may further include instructions to provide the aggregate public key and aggregate signature of a last image of the plurality of images. The instructions may further include instructions to authenticate at least one image of the plurality of images using the provided aggregate public key and aggregate signature. At least some of the images of the plurality of images may be the same. The aggregate signatures may be generated using a BLS signature scheme. The aggregate signatures may be generated using an ETA signature scheme. The aggregate public keys and aggregate signatures may be combined for a plurality of different sets of time periods using an MMM generic digital signature scheme.

In an embodiment, a non-transitory computer-readable medium is provided. The computer-readable medium comprising instructions that, when executed by at least one processor, cause the at least one processor to: receive a plurality of messages, wherein each message is associated with a time period from a set of time periods; receive a plurality of public key and private key pairs, wherein each pair is associated with a time period from the set of time periods; for each message of the plurality of messages: use the private key for the message to generate an aggregate signature for the message based on the message and an aggregate signature of a previous message of the plurality of messages; and generate an aggregate public key for the message using the public key associated with the message and an aggregate public key associated with the previous message; and authenticate at least one message of the plurality of messages using the aggregate public key and aggregate signature associated with a last message of the plurality of messages.

Embodiments may include some or all of the following features. At least some of the messages of the plurality of messages are the same. The aggregate signatures may be generated using a BLS signature scheme. The aggregate signatures may be generated using an ETA signature scheme. The aggregate public keys and aggregate signatures may be combined for a plurality of different sets of time periods using an MMM generic digital signature scheme. The messages may be one or more of bank records, images, or videos.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

The basic notations used herein are as follows: operators $|\ |$ and $|x|=\log_2 x$ denote the concatenation and the bit length of variable x, respectively.

$$x \xleftarrow{\$} S$$

means variable x is randomly and uniformly selected from set S. For any integer l, $(x_0 \ldots x_l)$ means $$\left(x_0 \xleftarrow{\$} S, \ldots, x_l \xleftarrow{\$} S\right).$$

$|S|$ denotes the cardinality of set S. The set of binary strings of any finite length is denoted as $\{0, 1\}^*$. The set of items $q_i$ for $i=0, \ldots, l-1$ is denoted by $\{q_i\}_{i=0}^{l-1}$. Log x means $\log_2 x$.

The maximum number of time periods for the base schemes is denoted as t. j: $1 \leq j \leq t$ is the current sampling index (also called a period or epoch). $m_j$ is jth message sampled (collected) from the system readings. i: $1 \leq i \leq j$ is the last index of the last sampled distinct message denoted as M. j': $1 \leq j' \leq j$ is the initial index at which the first instance of $M_i$ is sampled. $h_i^{j,j'}$ is the aggregate public key whose corresponding private keys $(x_{j'} \ldots x_j)$ are used to compute aggregate signature $\sigma_{j',j}$ on message $M_i\|j'$ that is continuously sampled and remains the same during periods (j',j).

$st_{j+1}=(\langle i,j-1,j'\rangle, \vec{M}, \vec{PK})$ is the state vector that maintains indexes, a message vector including distinct messages collected and a public key vector including their corresponding public keys until jth period. $(\vec{M}_i, \vec{PK}_i)$ denotes ith elements of the message and public key vectors, respectively. $\sigma_{i,t}$ is the aggregate signature on messages sampled during t periods.

The $CORE_{Base,t}^{BLS}$ scheme uses BLS signature with a hash chain strategy. However, as discussed before, the scheme offers partial public key aggregation, high space efficiency (with respect to total size of signatures, private and public keys) for extensions via MMM, and computational efficiency compared to a straightforward use of these building blocks towards obtaining an efficient single-signer forward-secure and aggregate signature scheme. The relevant notation used for this BLS based scheme is as follows: a bilinear pairing e: $G_0 \times G_1 \to G_T$. The pairing is efficiently computable, non-degenerate, and all three groups have prime order q. $g_0$ and $g_1$ are denoted as generators of groups $G_0$ and $G_1$, respectively.

In the scheme a hash function $H_0: M \to G_1$ may be used. Another suitable hash function is H: $\{0, 1\}^* \to \{0, 1\}^d$ where d is a small fixed integer (e.g., SHA-256). $H_1: Z_q^* \to Z_q^*$, $H_2$: $\{0, 1\}^* \to Z_q^*$, and $H_2$: $\{0, 1\}^k \to \{0, 1\}^k$ are also distinct cryptographic hash functions that may be used. All these hash functions may be treated as a random oracle.

The $CORE_{Base,t}^{ETA}$ scheme uses ETA signature as a building block. ETA is a signer efficient t-time digital signature scheme, which is based on Schnorr digital signature. ETA has O(K) public key size and it offers neither forward security nor signature or partial key aggregation. In $CORE_{Base,t}^{ETA}$, ETA is transformed into a t-time forward-secure and aggregate signature with partial public key aggregation capability. The relevant notation used for the ETA based scheme is as follows: q and p>q are large primes such that q|(p-1). a is a generator of the subgroup G of order q in $\mathbb{Z}_p^*$.

A signature scheme may consist of three algorithms SGN=(Kg,Sig,Ver) which are defined as follows. $(sk,PK) \leftarrow SGN \cdot Kg(1^K)$: Given the security parameter K, it outputs the private and public key pair $(sk,PK)$. $\sigma$ SGN·Kg (m,sk): Given the message m and the signer's private key sk, the algorithm outputs the signature $\sigma$. b SGN·Ver(m,b,PK): Given a message-signature pair $(m,\sigma)$, and a public key PK, the algorithm outputs b.

The MMM generic digital signature scheme can transform any digital signature scheme into a forward secure signature with a practically unbounded signing capability. The performance of this transformation depends on efficiency of the base signature scheme. The MMM signature is used to extend the t-time signatures into digital signatures with a practically unbounded signing capability. Since the t-time single-signer forward-secure and aggregate signatures offer both signature and partial public key aggregation, they minimize the total size of private, public key and signature space. Hence, they serve as an ideal building block to be extended via MMM. The MMM scheme is composed of the sum product composition algorithm (referred to as the Σ algorithm).

Remark: The schemes are presented in standard form; however, they can be efficiently implemented with Elliptic Curves (EC) that offer significant space and computational advantages.

The details of proposed schemes are presented as below. As described above, the base schemes are strictly t-time signatures, which compute no more or less than t signatures. Hence, if verification is done before t items have been sampled, a sealing function may be called by setting variable c=1. This creates a sealing message marking the time stamp of the final message and its index. The signer then generates all private keys from its current index to t, aggregates them, and the signs the sealing message with this aggregated private key. The signer then generates the corresponding public key for this aggregated private key, updates the list, and finalizes the t-time signature generation.

The signature generation and verification algorithms of $CORE_{Base,t}^{ETA}$ are described in Algorithm 1, Algorithm 2 and Algorithm 3, respectively. Key generation, signature generation and verification algorithms of $CORE_{Base,t}^{ETA}$ are described in Algorithm 4, Algorithm 5 and Algorithm 6, respectively. The Σ algorithm of the MMM scheme is described in Algorithm 7. The full CORE schemes, which can sign practically unbounded number of messages, can be obtained by extending them into $t^n$ time period with iterative product composition.

---

Algorithm 1 Key Generation Algorithm for Basic CORE Scheme with BLS for t time periods

---

$(sk_1, PK) \leftarrow CORE \cdot Kg(1^\kappa, t)$: The private/public key pair for t time periods are computed as follows.

1: $x_1 \xleftarrow{\$} Z_q^*$

2: $h_i \leftarrow g_1^{x_i} \in G_1$ for $i = 1, \ldots, t$, where $x_{i+1} \leftarrow H(x_i)$, 3: $sk_1 \leftarrow x_1, PK = \left(H\left(\prod_{i=1}^{t} h_i \in G_1\right)\right)$.

---

Algorithm 2 Signature Generation Algorithm for Basic CORE Scheme with BLS for t time periods

---

$(sk_j, \langle st_j, \sigma_{1,j}\rangle) \leftarrow CORE_{Base,t}^{BLS} \cdot Sig(sk_j, \sigma_{1,j-1}, m_j, st_j, c)$: The initialization condition for the signature generation algorithm is $(i = j = j' = 1, c = 0, )$, $m_1 = M_1$, $h_1^{0,1} = \sigma_{1,0} = 1$ and $(\vec{M}, \vec{PK}, st_1)$ are empty. Given the message $m_j$ sampled at jth time period, continue as follow:

1: if $j > t$ then return the final output $(sk_j = \bot, \langle st_j, \sigma_{1,t}\rangle)$ and exit.
2: else if $c = 1$ then
3:    $i = 1 + 1$.
4:    $M_i \leftarrow$ "seal||timestamp||j||t".
5:    $x_{j,t} \leftarrow \sum_{l=j}^{t} H(x_l)$, where $x_{l+1} \leftarrow H(x_l)$.

6:    $\sigma_{j,t} \leftarrow H_0(M_i||j' + 1)^{x_{j,t}} \in G_0$, $\sigma_{1,t} \leftarrow \sigma_{1,j-1} \cdot \sigma_{j,t} \in G_0$.
7:    $h_i^{j,t} \leftarrow g_1^{x_{j,t}} \in G_1$.
8:    Delete $(x_j, \ldots, x_t, x_{j,t}, \sigma_{1,j-1}, \sigma_{j,t})$.
9:    Add $(h_i^{j-1,j'}, h_i^{j,t})$ and $(M_i^{j-1,j'}, M_i^{j,t} = M_i||j' + 1)$ to $\vec{PK_i}$ and $\vec{M_i}$, respectively.
10:    $j \leftarrow t + 1$ and update $st_{j+1} = (\langle i, j-1, j'\rangle, \vec{M}, \vec{PK})$).
11:    return the final output $(sk_j = \bot, \langle st_j, \sigma_{1,t}\rangle)$ and exit.
12: else if $m_j \neq M_i$ then
13:    Add $h_i^{j-1,j'}$ and $M_i^{j-1,j'} = M_i||j'$ to $\vec{PK_i}$ and $\vec{M_i}$, respectively, and update $st_{j+1} = (\langle i, j-1, j'\rangle, \vec{M}, \vec{PK})$.
14:    $j' \leftarrow j$.
15:    $i \leftarrow i + 1$.
16:    $M_i \leftarrow m_j$.
17:    $\sigma_j \leftarrow H_0(M_i||j')^{x_j} \in G_0$.
18:    $h_i^{j,j'} \leftarrow h_j$.
19: else
20:    $\sigma_j \leftarrow H_0(M_i||j')^{x_j} \in G_0$.
21:    $h_i^{j,j'} \leftarrow h_i^{j-1,j'} \cdot h_j$, delete $h_i^{j-1,j'}$ and $h_j$.
22: $\sigma_{1,j} \leftarrow \sigma_{1,j-1} \cdot \sigma_j \in G_0$, delete $\sigma_{1,j-1}$ and $\sigma_j$.
23: $x_{j+1} \leftarrow H(x_j)$, delete $x_j$ and $sk_{j+1} \leftarrow x_{j+1}$.
24: $h_{j+1} \leftarrow g_1^{x_{j+1}} \in G_1$.
25: $j \leftarrow j + 1$.
26: if $j > t$ then add $h_i^{j-1,j'}$ and $M_i^{j-1,j'} = M_i||j'$ to $\vec{PK_i}$ and $\vec{M_i}$, respectively, update $st_j = (\langle i, j-1, j'\rangle, \vec{M}, \vec{PK})$ return the final output as $(sk_j = \bot, \langle st_j, \sigma_{1,t}\rangle)$ and exit.
27: return intermediate output $(sk_j, \langle st_j, \sigma_{1,j}\rangle)$.

---

Algorithm 3 Signature Verification Algorithm for Basic CORE Scheme with BLS for t time periods

---

$b \leftarrow CORE_{Base,t}^{BLS} \cdot Ver(st = (\langle i, j-1, j'\rangle, \vec{MPK}), \sigma_{i,j}, PK)$:

1: if $1 \leq j' \leq i \leq j \neq t$ then return $b = 0$.
2: else if $H\left(\prod_{l=1}^{i} \vec{PK_l}\right) \neq PK$ then return $b = 0$
3: else if $e(g_1, \sigma_1, t) \neq \prod_{l=1}^{i} e(\vec{PK_l}, H_0(\vec{M_l}))$ then return $b = 0$
4: else return $b = 1$.

---

Algorithm 4 Key Generation Algorithm for Basic CORE Scheme with modified ETA for t time periods

---

$(sk_1, PK) \leftarrow CORE_{Base,t}^{ETA} \cdot Kg(1^\kappa, t)$: the private/public key pair for t time periods are computed as follows.
1: Generate $(y_1, h_1, \langle q, p, \alpha\rangle)$ as in ETA key generation step 1 (which is identical to Schnorr signature key generation algorithm), where $y_1 \xleftarrow{\$} Z_Q^*$ and $h_1 \leftarrow a^{y_1} \mod p$.

2: $r_1 \xleftarrow{\$} Z_Q^*$.

3: $R_{1,t} \leftarrow \prod_{i=1}^{t} \alpha^{r_i} \mod p$, where $r_{i+1} \leftarrow H_1(r_i)$.

4: $h_{1,t} \leftarrow \prod_{i=t}^{t} \alpha^{y_i} \mod p$, where $y_{i+1} \leftarrow H_1(y_i)$.

5: $x_1 \xleftarrow{\$} \{0, 1\}^K$.

6: $sk_1 \leftarrow (y_1, r_1, x_1)$, $PK = (R' = H_1(R_{1,t}), Y' = H_1(h1,t))$.

---

Algorithm 5 Signature Generation Algorithm for Basic CORE Scheme with ETA for t time periods

---

$(sk_j, \langle st_j, \sigma_{1,j}\rangle) \leftarrow CORE_{Base,t}^{ETA} \cdot Sig(sk_j, \sigma_{1,j-1}, m_j, st_j, c)$: The initialization condition for the signature generation algorithm is $(i = j = j' = 1, c = 0,)$, $m_1 = M_1$, $h_1^{0,1} = 1$, $s_{1,0} = 0$ and $(\vec{M}, \vec{PK}, st_1)$ are empty. The signer keeps $x_1$ to be released as a part of final signature $\sigma_{1,t}$, while deletes intermediate x values to save space (seed x is not used for forward secrecy and therefore cane be released but only after final signature $\sigma_{1,t}$ was computed). Given the message $m_j$ sampled at jth time period, continue as follow:

1: if $j > t$ then return the final output $(sk_j = \bot, \langle st_j, \sigma_{1,t}\rangle)$ and exit.
2: else if $c = 1$ then
3:    $x_{i+1} \leftarrow H_3(x_i)$.
4:    $i = 1 + 1$.
5:    $M_i \leftarrow$ "seal||timestamp||j||t".

6:    $yj, t \leftarrow \sum_{l=j}^{t} H_1(y_l) \mod q$, where $y_{l+1} \leftarrow H_1(y_l)$.

7:    $rj, t \leftarrow \sum_{l=j}^{t} H_1(r_l) \mod q$, where $r_{l+1} \leftarrow H_1(r_l)$.

8:    $s_{j,t} \leftarrow r_{j,t} - H_1(M_i||j + 1||x_i) \cdot y_{j,t} \mod q$.

Algorithm 5 Signature Generation Algorithm for Basic CORE Scheme with ETA for t time periods 9:   $s_{1,t} \leftarrow s_{1,j-1} + s_{j,t}$ mod q.
10:  $h_j^{j,t} \leftarrow \alpha^{y_{j,t}}$ mod p.
11:  Delete $(y_i, \ldots, y_t, y_{j,t}, r_j, \ldots, r_t, r_{j,t}, x_i, x_{i+1}, s_{j,t}, s_{1,j-1})$.
12:  Add$(h_j^{j-1,j}, h_j^{j,t})$ and $(M_i^{j-1,j}, M_i^{j,t} = M_i || j' + 1)$ to $\vec{PK}_i$ and $\vec{M}_i$, respectively.
13:  $j \leftarrow t + 1$ and update $st_j = (<i, j-1, j'>, \vec{M}, \vec{PK})$.
14:  $\sigma_{1,t} \leftarrow (s_{1,t}, x_1)$
15:  return the final state $(sk_j = \bot, <st_j, \sigma_{1,t}>)$ and exit.
16   else if $m_j \neq M_i$ then
17:  Add $h_j^{j-1,j'}$ and $M_i^{j-1,j'} = M_i || j'$ to $\vec{PK}_i$ and $\vec{M}_i$, repectively, and update $st_{j-1} = (<i, j-1, j'>, \vec{M}, \vec{PK})$.
18:  $j' \leftarrow j$.
19:  $x_{i-1} \leftarrow x_i$, delete $x_i$ (to save space).
20:  $i \leftarrow i + 1$.
21:  $M_i \leftarrow m_j$.
22:  $s_j \leftarrow r_j - H_1(M_i||j'||x_i) \cdot y_j$ mod q.
23:  $h_j^{j,j'} \leftarrow h_j$.
24:  else
25:  $s_j \leftarrow r_j - H_1(M_i||j'||x_i) \cdot y$ mod q.
26:  $h_j^{j,j'} \leftarrow h_j^{j-1,j'} \cdot h_j$, delete $h_j^{j-1,j'}$ and $h_j$.
27:  $s_{1,j} \leftarrow s_{1,j-1} + s_j$ mod q, delete $(s_{1,j-1}, s_j)$.
28:  $y_{j+1} \leftarrow H_1(y_j)$, delete $y_j$.
29:  $r_{j+1} \leftarrow H_1(r_j)$, delete $r_j$.
30:  $h_{j+1} \leftarrow \alpha^{y_{j-1}}$ mod p.
31:  $j \leftarrow j + 1$.
32:  if $j > t$ then add $h_j^{j-1,j'}$ and $M_i^{j-1,j'} = M_i||j'$ to $\vec{PK}_i$ and $\vec{M}_i$, respectively, update $st_j = (<i,j-1, j'>, \vec{M}, \vec{PK})$ return the final output as $(sk_j = \bot, <st_j, \sigma_{1,t}, x_1)>)$ and exit.
33:  return intermediate output $(sk_j = \bot, <st_j, \sigma_{1,j} = (s_{1,j}, x_i)>)$.

Algorithm 6 Signature Verification Algorithm for Basic CORE Scheme with ETA for t time periods $b \leftarrow CORE_{Base,t}^{ETA}.Ver(st = (<i, j-1, j'>, \vec{M}, \vec{PK}), \sigma_{1,j}, PK)$:
1: if $1 \leq j' \leq i \leq j \neq t$ then return $b = 0$.
2: else if $H_1(\prod_{l=1}^{i} \vec{PK}_l$ mod p$) \neq Y'$ then return $b = 0$.
3:  else if $R' \neq \prod_{l=1}^{i} \vec{PK}_l^{H_1(\vec{M}_l || x_l)} \cdot \alpha^{s_{1,t}}$ mod p, where $x_l + 1 \leftarrow H_3(x_l)$ then return $b = 0$.
4: else return $b = 1$.

Algorithm 7 Sum Composition (Σ) Algorithms in MMM (sk, PK) Σ.Kg($1^K$, r, levels, i, SGN):
1:  $(r_0, r_1)$   G(r)
2:  if levels = 0 then
3:     $(sk_0, pk_0) \leftarrow SGN.Kg(1^K, r_0)$
4:     $(sk_1, pk_1) \leftarrow SGN.Kg(1^K, r_1)$
5:     PK   H($pk_0 || pk_1$), sk $\leftarrow (sk_0, r_1, pk_0, pk_1)$
6:     return (sk, PK)
7:  $(sk_0, pk_0)$   Σ.Kg($1^K$, $r_0$, levels – 1, i + 1, SGN)
8:  $(sk_1, pk_1)$   Σ.Kg($1^K$, $r_1$, levels – 1, i + 1, SGN)
9:  PK $\leftarrow$H($pk_0, pk_1$), sk $\leftarrow$ ($spk_0, r_1, pk_0, pk_1$)
10: return (sk, PK)

$(\sigma, \bar{t}) \sum \cdot Sig(\bar{t}, sk = (sk', r_1, pk_0, pk_1), M, levels, i, T, SGN)$:
1:  if levels = 0 then
2:     if $\bar{t} < T/2$ then $\bar{t}'$   $\bar{t}$ else $\bar{t}' \leftarrow t' - T/2$
3:     $\sigma$  SGN.Sig(s k', M), $\sigma \leftarrow <\sigma', pk_0, pk_1>$
4:     return ($\sigma', \bar{t}$)
5:  else
6:     if $\bar{t} < T/2$ then Algorithm 7 Sum Composition (Σ) Algorithms in MMM 7:     $(\sigma', \bar{t}')$ Σ.Sig($\bar{t}$, sk', $\bar{t}$, M, levels – 1, i + 1, SGN)
8:  else $\bar{t} \leftarrow \bar{t}-T/2$
9:     $(\sigma', \bar{t}')$ $\leftarrow$ Σ.Sig($\bar{t}$, sk', $\bar{t}$, M, levels – 1, i + 1, SGN)
10:    $(\sigma)$   $<\sigma', pk_0, pk_1>$ and return $(\sigma', \bar{t})$ $\sum \cdot Up(sk = <sk', r_1, pk_0, pk_1>, \bar{t}, levels, i, SGN)$:

1:  if $\bar{t} + 1 < T$ then sk' $\leftarrow$ SGN.UP(sk')
2:  elseif ($\bar{t}+1 = T$) then
3:     (sk',pk') $\leftarrow$ SGN.Kg($r_1$), $r_1$   0, delete pk' else sk" $\leftarrow$ SGN.UP(sk')
4:  if $\bar{t} < T/2$ then
5:     Σ.Up(sk", $r_1$, $pk_0$, $pk_1$,$\bar{t}$,levels – 1, i + 1, SGN)
6:  else Σ.Up(sk", $r_1$, $pk_0$, $pk_1$,$\bar{t}$-T/2,levels – 1, i + 1, SGN)

$b \sum \cdot Ver(pk, M, \sigma = <\sigma', pk_0, pk_1>, \bar{t}, levels, i, SGN)$:

1:  if H($pk_0 || pk_1$) $\neq$ pk then return b = 0.
2:  if levels = 0 then
3:     if $\bar{t} < T/2$ then SGN.Ver($pk_0$, M, σ)
4:     else   SGN.Ver($pk_1$,M, σ)
5:  else
6:     if $\bar{t} < T/2$ then
7:     return $\sum \cdot Ver(pk_0, M, \sigma = <\sigma', pk_0, pk_1>,$
       $\bar{t}$,
8:     levels–1, i + 1, SGN)
9:     else return $\sum \cdot Ver(pk_1, M, \sigma = <\sigma', pk_0, pk_1>,$
       $\bar{t}$-T/2, levels–1, i+1, SGN)

Figure 1:
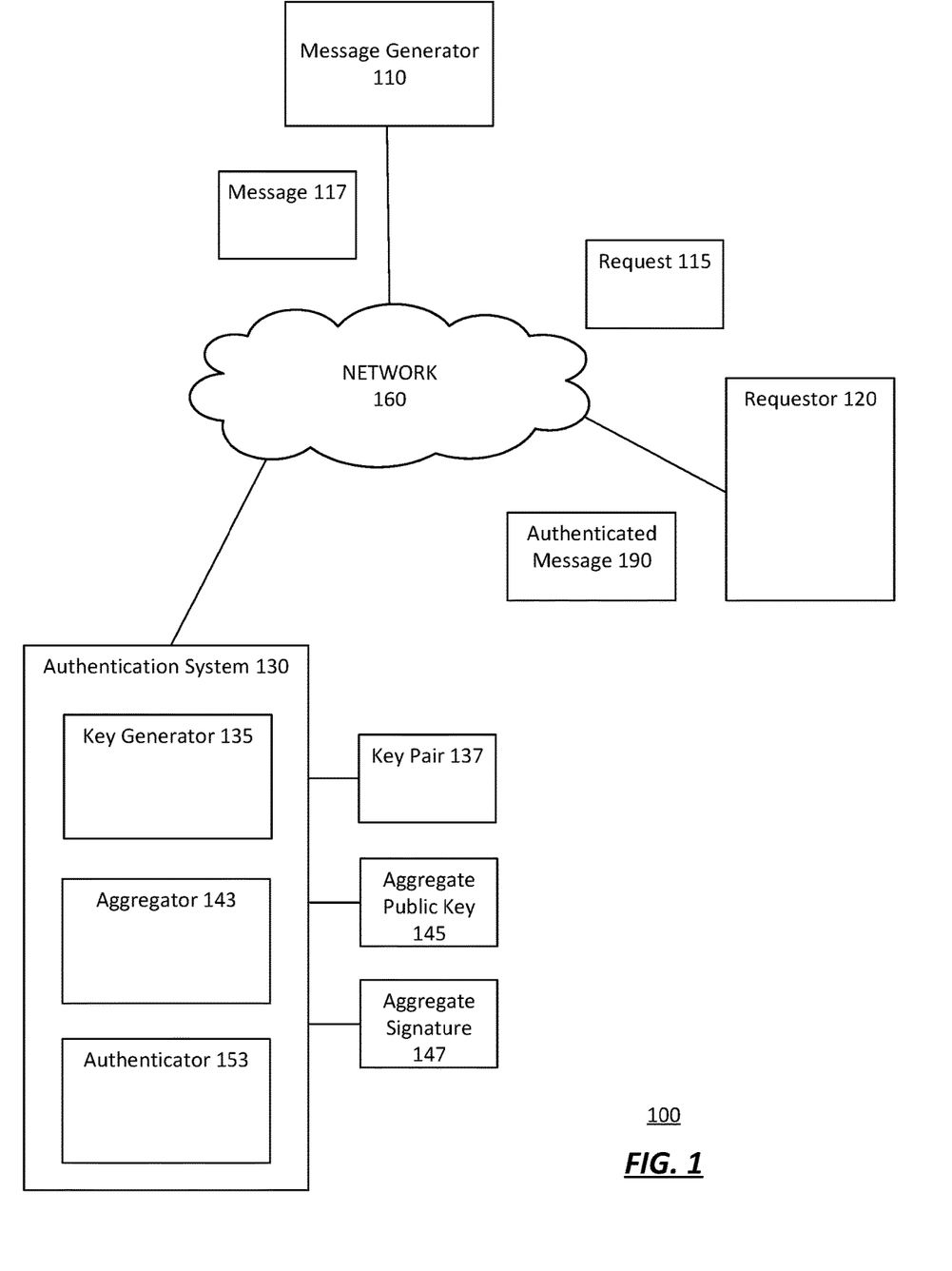
FIG. 1 is an illustration of an example environment for providing aggregate signatures.

FIG. 1 is an illustration of an environment 100 for authenticating messages. As shown, the environment 100 may include an authentication system 130 and a message generator 110 in communication through a network 160. While shown as separate, in some embodiments, the message generator 110 and the authentication system 130 may be implemented together using one or more computing devices such as the computing device 300 illustrated with respect to FIG. 3.

The message generator 110 may generate one or more messages. Depending on the embodiment, the messages may include images or videos (e.g., images or video from a security camera), transaction records (e.g., bank records, visitor logs, phone or text records), and computer programs (e.g., operating systems, program versions, and updates).

In some embodiments, the messages 117 may be a type of file or data that does not change very much overtime. For example, messages 117 such as operating system versions may not change very much between updates. As another example, messages 117 such as daily bank account transaction logs may have days were the logs are identical due to infrequent deposits or withdrawals.

Each message 117 may be associated with a time that the message 117 was generated. The message generator 110 may provide the messages 117 in the order that they are generated to the authentication system 130.

Figure 3:
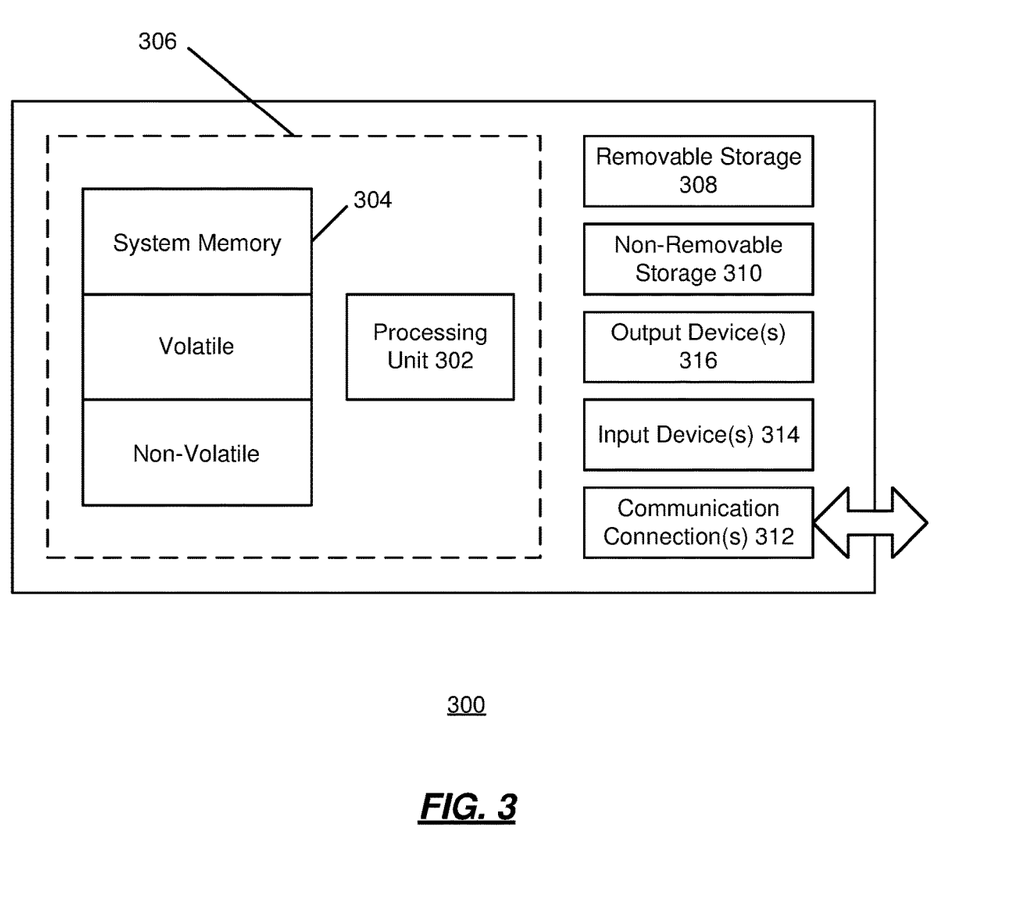
FIG. 3 illustrates an example computing device.

The authentication system 130 may receive the messages 117 from the message generator 110 and may allow for the authentication of any message of the plurality of messages 117. As shown, the authentication system 130 includes several components including, but not limited to, a key generator 135, an aggregator 143, and an authenticator 153. More or fewer components may be supported. Each of the components of the authentication system 130 may be implemented together or separately by a computing device such as the computing device 300.

The key generator 135 may generate a key pair 137 for each messages of the plurality of messages 117. Depending on the embodiment, the key generator 135 may generate the messages using the algorithm 1 or the algorithm 4 described above. Each public key pair 137 for a message 117 may include a private key and a public key. Any method for generating public and private keys may be used.

The aggregator 143 may generate an aggregate signature for 147 for each message 117 of the plurality of messages 117. The aggregator 143 may generate the aggregate signature 147 for a message 117 using either the algorithm 2 or algorithm 5. Depending on the embodiment, the aggregate signature 147 for a message 117 may generated using the key pair 137 associated with the message 117 and an aggregate signature 147 generated for a previous message of the plurality of messages 117.

The aggregator 143 may generate an aggregate public key 145. The aggregator may generate an aggregate public key 145 for each message 117 of the plurality of messages 117. In some embodiments, the aggregator 143 may generate an aggregate public key 143 for a message 117 using the public key of the key pair 137 associated with the message 117, and the aggregate public key 145 generated for a previous message 117. The aggregate public keys 145 and aggregate signatures for all of the messages 117 in the plurality of messages 117 may be stored by the aggregator 143.

At some time, a requestor 120 may desire to authenticate one of the messages 117 in the plurality of messages. For example, the requestor 120 may be an auditor who would like to verify the authenticity of a message 117 such as a bank record. As another example, the requestor 120 may be a law enforcement officer who may want to authenticate a message 117 such as a video that may be used as evidence. The requestor may have a copy of the message 117 and the message 117 may be associated with a particular time.

The requestor 120 may send a request to the authentication system 130 to authenticate the message 117. Depending on the embodiment, the request 115 may identify the time associated with the message 117 and/or may include the message 117 itself.

In response to the request, the authenticator 153 may authenticate the message 117 identified in the request. The authenticator 153 may authenticate the identified message 117 using the aggregate signature 147 and the aggregate public key 145 of the last message of the plurality of messages 117. If the message 117 is authenticated, the authentication system 130 may provide an authenticated message 190 to the requestor 120. If the message 117 cannot be authenticated then the authentication system 130 may provide an indication that the message 117 of the request 115 cannot be authenticated.

Figure 2:
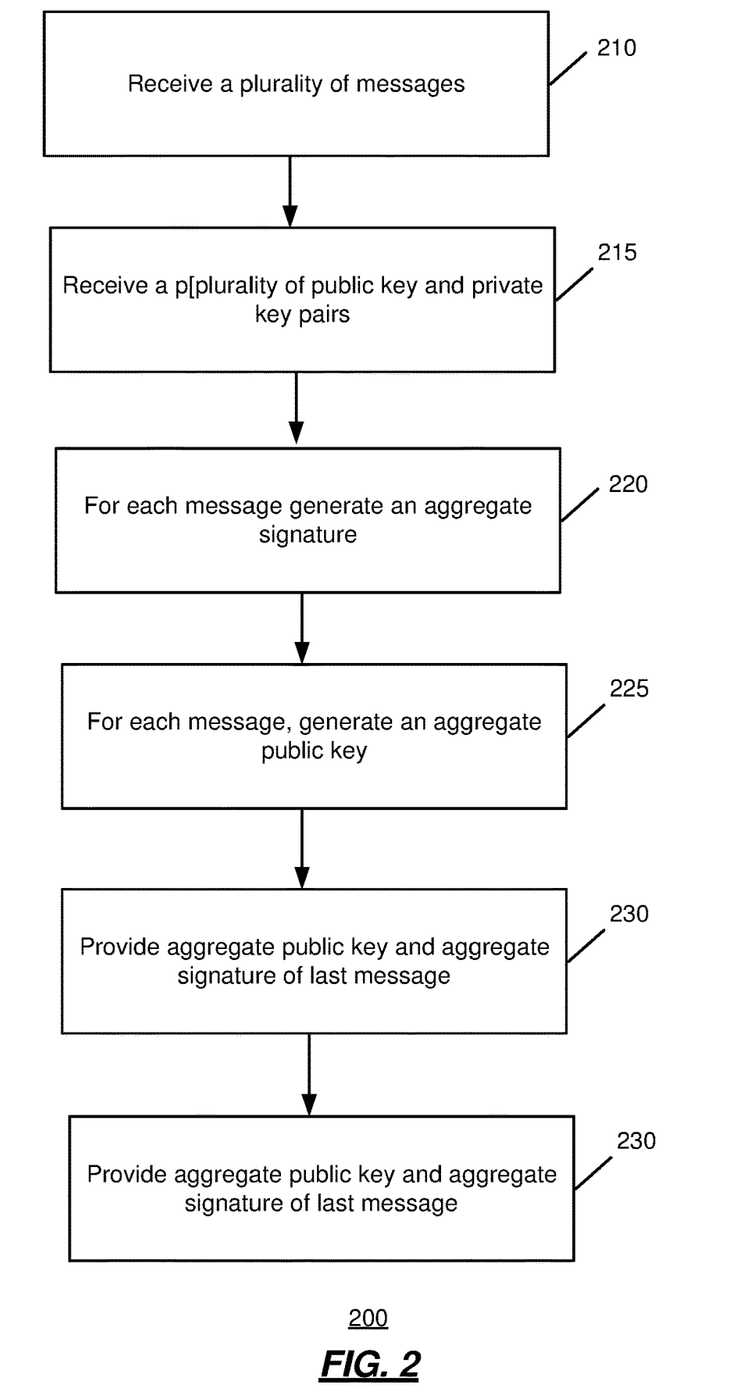
FIG. 2 is an illustration of an example method for generating an aggregate signature and an aggregate public key for a message.

FIG. 2 is an illustration of an example method 100 for generating an aggregate public key and aggregate signature for a plurality of messages and for authenticating at least one message of the plurality of messages. The method 200 may be implemented by the authentication system 130 of FIG. 1.

At 210, a plurality of messages is received. The plurality of messages 117 may be received by the authentication system 130. Each message 117 may be associated with a time period up until a maximum time period t. The plurality of messages 117 is not limited to messages and may include a variety of file and application types such as images, and bank account statements or statuses. Other types of files or applications may be supported. The method 200 as described may be particularly well suited for files or applications where updates are not frequent, but security is very important. For example, the images or videos generated by a security camera may not change very often, but it may be very important that a particular image or video can be authenticated.

At 215, a plurality of public key and private key pairs is received. The plurality of public key and private key pairs 137 may be received by the authentication system 130. Alternatively, or additionally the key pairs 137 may have been generated by the key generator 135. The plurality of public and private key pairs 137 may be generated using the algorithm 1 or the algorithm 4 described above. The algorithm 1 and 4 may both generate t public and private key pairs 137 with one private and public key pair 137 corresponding to each time period. Any method or technique for generating public and private key pairs 137 may be used.

At 220, for each message, an aggregate signature is generated. The aggregate signature 147 for a message 117 may be generated by the aggregator 143. The aggregate signature 147 for a message 117 may be generated using either the algorithm 2 or the algorithm 5 described above, the private key of the key pair 137 associated with the message 117, and the aggregate signature 147 generated for a previous message 117 of the plurality of messages 117. However, any signature aggregation method may be used. This may include potential signature schemes with post-quantum security (e.g., lattice-based scheme and coding based schemes).

At 225, for each message, an aggregate public key is generated. The aggregate public key 145 may be generated by the aggregator 143. The aggregate public key 145 may be generated using the public key of the key pair 137 of the message 117 and an aggregate public key 145 generated for a previous message 117 of the plurality of messages 117. Any method for public key aggregation may be used.

At 230, the aggregate public key and aggregate signature of a last message is provided. The aggregate public key 145 and aggregate signature 147 of the last message 117 may be provided by the authentication system 130. The aggregate public key 145 and aggregate signature 147 of the last message 117 of the plurality of messages 117 may be provided to a user or individual who wishes to authenticate any of the messages 117 of the plurality of messages 117.

At 235, at least one message is authenticated using the aggregate public key and aggregate signature. The at least one message 117 may be authenticated by the authenticator 153 using one or more of the algorithms 3 and 6 described above.

FIG. 3 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing aspects described herein includes a computing device, such as computing device 300. In its most basic configuration, computing device 300 typically includes at least one processing unit 302 and memory 304. Depending on the exact configuration and type of computing device, memory 304 may be volatile (such as random access memory (RAM)), non-volatile (such as read-only memory (ROM), flash memory, etc.), or some combination of the two. This most basic configuration is illustrated in FIG. 3 by dashed line 306.

Computing device 300 may have additional features/functionality. For example, computing device 300 may include additional storage (removable and/or non-removable) including, but not limited to, magnetic or optical disks or tape. Such additional storage is illustrated in FIG. 3 by removable storage 308 and non-removable storage 310.

Computing device 300 typically includes a variety of tangible computer readable media. Computer readable media can be any available tangible media that can be accessed by device 300 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 304, removable storage 308, and non-removable storage 310 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of computing device 300.

Computing device 300 may contain communications connection(s) 312 that allow the device to communicate with other devices. Computing device 300 may also have input device(s) 314 such as a keyboard, mouse, pen, voice input device, touch input device, etc. Output device(s) 316 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a plurality of messages, wherein each message is associated with a time period from a set of time periods;
   receiving a plurality of public key and private key pairs, wherein each pair is associated with a time period from the set of time periods;
   for each message of the plurality of messages:
   using the private key for the message to generate an aggregate signature for the message based on the message and an aggregate signature of a previous message of the plurality of messages; and
   generating an aggregate public key for the message using the public key associated with the message and an aggregate public key associated with the previous message;
   providing the aggregate public key and aggregate signature of a last message of the plurality of messages; and
   authenticating at least one message of the plurality of messages using the provided aggregate public key and aggregate signature.

2. The method of claim 1, wherein at least some of the messages of the plurality of messages are the same.

3. The method of claim 1, wherein the aggregate signatures are generated using a BLS signature scheme.

4. The method of claim 1, wherein the aggregate signatures are generated using an ETA signature scheme.

5. The method of claim 1, wherein the aggregate public keys and aggregate signatures are combined for a plurality of different sets of time periods using an MMM generic digital signature scheme.

6. A system comprising:
   at least one processor; and
   a tangible computer readable medium storing instructions that when executed by the at least one processor cause the at least one processor to:
   receive a plurality of images, wherein each image is associated with a time period from a set of time periods;
   receive a plurality of public key and private key pairs, wherein each pair is associated with a time period from the set of time periods;

for each image of the plurality of images:
  use the private key for the message to generate an aggregate signature for the image based on the image and an aggregate signature of a previous image of the plurality of images; and
  generate an aggregate public key for the image using the public key associated with the image and an aggregate public key associated with the previous image;
  provide the aggregate public key and aggregate signature of a last image of the plurality of images; and
  authenticate at least one image of the plurality of images using the provided aggregate public key and aggregate signature.

7. The system of claim 6, wherein at least some of the images of the plurality of images are the same.

8. The system of claim 6, wherein the aggregate signatures are generated using a BLS signature scheme.

9. The system method of claim 6, wherein the aggregate signatures are generated using an ETA signature scheme.

10. The system of claim 6, wherein the aggregate public keys and aggregate signatures are combined for a plurality of different sets of time periods using an MMM generic digital signature scheme.

11. A non-transitory computer-readable medium comprising instructions that, when executed by at least one processor, cause the at least one processor to:
  receive a plurality of messages, wherein each message is associated with a time period from a set of time periods;
  receive a plurality of public key and private key pairs, wherein each pair is associated with a time period from the set of time periods;
  for each message of the plurality of messages:
    use the private key for the message to generate an aggregate signature for the message based on the message and an aggregate signature of a previous message of the plurality of messages; and
    generate an aggregate public key for the message using the public key associated with the message and an aggregate public key associated with the previous message; and
  authenticate at least one message of the plurality of messages using the aggregate public key and aggregate signature associated with a last message of the plurality of messages.

12. The computer-readable medium of claim 11, wherein at least some of the messages of the plurality of messages are the same.

13. The computer-readable medium of claim 11, wherein the aggregate signatures are generated using a BLS signature scheme.

14. The computer-readable medium of claim 11, wherein the aggregate signatures are generated using an ETA signature scheme.

15. The computer-readable medium of claim 11, wherein the aggregate public keys and aggregate signatures are combined for a plurality of different sets of time periods using an MMM generic digital signature scheme.

16. The computer-readable medium of claim 11, wherein the messages are one or more of bank records, images, or videos.

* * * * *